US005699506A

United States Patent [19]
Phillips et al.

[11] Patent Number: 5,699,506
[45] Date of Patent: Dec. 16, 1997

[54] METHOD AND APPARATUS FOR FAULT TESTING A PIPELINED PROCESSOR

[75] Inventors: Christopher E. Phillips, San Jose; Narendra Sankar, Sunnyvale, both of Calif.

[73] Assignee: National Semiconductor Corporation, Santa Clara, Calif.

[21] Appl. No.: 445,568

[22] Filed: May 26, 1995

[51] Int. Cl.$^6$ .................................................. G06F 11/00
[52] U.S. Cl. ........................... 395/183.13; 371/22.5
[58] Field of Search ...................... 395/183.18, 183.06, 395/183.13, 183.01, 183.04, 800, 375; 371/22.5, 22.3, 22.4, 21.2, 25; 324/73.1, 763

[56] References Cited

U.S. PATENT DOCUMENTS

| | | | |
|---|---|---|---|
| 4,493,078 | 1/1985 | Daniels | 371/25.1 |
| 4,594,711 | 6/1986 | Thatte | 371/25.1 |
| 4,658,354 | 4/1987 | Nukiyama | 395/183.06 |
| 4,701,916 | 10/1987 | Naven et al. | 371/15.1 |
| 4,894,800 | 1/1990 | Hudson, Jr. | 371/22.5 |
| 5,099,421 | 3/1992 | Buerle et al. | 395/375 |
| 5,189,319 | 2/1993 | Fung et al. | 307/452 |
| 5,204,953 | 4/1993 | Dixit | 395/400 |
| 5,210,864 | 5/1993 | Yoshida | 395/183.13 |
| 5,226,149 | 7/1993 | Yoshida et al. | 395/183.01 |
| 5,254,888 | 10/1993 | Lee et al. | 307/480 |
| 5,259,006 | 11/1993 | Price et al. | 375/107 |
| 5,404,473 | 4/1995 | Papworth et al. | 395/375 |
| 5,408,626 | 4/1995 | Dixit | 395/400 |

FOREIGN PATENT DOCUMENTS

| | | |
|---|---|---|
| 0380858 | 8/1990 | European Pat. Off. . |
| 2266606 | 11/1993 | United Kingdom . |

OTHER PUBLICATIONS

Serra, Micaela & Dervisoglu, Bulent I, "Testing", Chapter 79, *The Electrical Engineering Handbook*, Richard C. Dorf, Editor-in-Chief, pp. 1808–1837, CRC Press.

L–T Wang et al., "Feedback Shift Registers Fro Self–Testing Ciruits", *VLSI Systems Design*, Dec. 1986.

Masakazu Shoji, "CMOS Dynamic Gates", Chapter 5, *AT&T CMOS Digital Circuit Technology*, Prentice Hall, 1988, pp. 210–257.

Guthrie, Charles, "Power–On Sequencing For Liquid Crystal Displays; Why, When, and How", *Sharp Application Notes*, Sharp Corporation, 1994, pp. 2–1 thru 2–9.

Bernd Moeschen, "NS32SP160—Feature Communication Controller Architecture Specification", *National Semiconductor*, Rev. 1.0, May 13, 1993.

Agarwl, Rakesh K., *80×86 Architecture and Programming, vol. II: Architecture Reference*, Chapter 4, Prentice Hall, 1991, pp. 542–543.

Intel486 Microprocessor Family Programmer's Reference Manual, Intel Corporation, 1993, pp. 3–28–3–32.

"8237A High Performance Programmable DMA Controller (8237A-4, 8237A-5)", *Peripheral Components*, Intel, 1992, pp. 3–14 thru 3–50.

Kane, Gerry, "R2000 Processor Programming Model", Chapter 2, *MIPS RISC Architecture*, MIPS Computer Systems, Inc.

(List continued on next page.)

*Primary Examiner*—Ly V. Hua
*Attorney, Agent, or Firm*—Limbach & Limbach L.L.P.

[57] ABSTRACT

A method and apparatus for fault testing a pipelined processor. In test mode, the stage registers are reconfigured as multiple input shift registers by switching in a few exclusive-OR gates. Also, the execute stage is prevented from executing any instructions. A unique sequential test sequence of instructions are run through the processor at normal speed. It is known that a particular test sequence (and thus a unique sequential input pattern to the MISR, assuming no faults) will result in a unique signature pattern existing in the MISR at the end of the sequence. If the signature pattern is not found in the MISR at the end of the test sequence, then it is known that a fault exists on the chip.

27 Claims, 5 Drawing Sheets

OTHER PUBLICATIONS

Hennessy, John, et al., "Interpreting Memory Addresses", *Computer Architecture A Quantitative Approach*, pp. 95–97, Morgan Kaufmann Publishers, Inc. 1990.

*PowerPC601 Reference Manual*, IBM, 1994, Chapter 9, "System Interface Operation", pp. 9–15 thru 9–17.

Intel Corp. Microsoft Corp., *Advanced Power Management (APM) Bios Interface Specification*, Revision 1.1, Sep. 1993.

Intel Corporation, *i486 Micro Processor Hardware Reference Manual*, Processor Bus, pp. 3–28 thru 3–32.

METHOD AND APPARATUS FOR FAULT TESTING A PIPELINED PROCESSOR

FIELD OF THE INVENTION

The invention pertains to a method and apparatus for fault testing a pipelined microprocessor. More particularly, the invention pertains to a method and apparatus for reconfiguring pipeline stage buffer registers as a linear feedback shift register for testing.

BACKGROUND OF THE INVENTION

Modern microprocessors employ pipelining techniques which allow multiple, consecutive instructions to be prefetched, decoded, and executed in separate stages simultaneously. Accordingly, in any given clock cycle, a first instruction may be executed while the next (second) instruction is simultaneously being decoded, and the instruction after that (a third instruction) is simultaneously being fetched. Since less processing is performed on each instruction per cycle, cycle time can be made shorter. Thus, while it requires several clock cycles for a single instruction to be pre-fetched, decoded, and executed, it is possible to have a processor completing instructions as fast as one instruction per cycle with a very short cycle period, because multiple consecutive instructions are in various stages simultaneously.

Typically, stage registers for temporarily holding data are used to define the boundary between each pair of consecutive stages in a microprocessor pipeline. The data calculated in a particular stage is written into these stage registers before the end of the cycle. When the pipeline advances upon the start of a new instruction cycle, the data is written out of the stage registers into the next stage where it can be further processed during that next instruction processing cycle. Most pipelined microprocessor architectures have at least four stages including, in order of flow, 1) a prefetch stage, 2) a decode stage, 3) an execute stage, and 4) a write-back stage. In the prefetch stage, instructions are read out of memory (e.g., an instruction cache) and stored in a buffer. Depending on the particular microprocessor, in any given cycle, the prefetch buffer may receive one to several instructions.

In the decode stage, the processor reads an instruction out of the prefetch buffer and converts it into a series of control lines which can be used by the execute stage of the microprocessor to perform one or more operations, such as arithmetic or logical operations. In the execute stage, the actual operations are performed. Finally, in the write-back stage, the results of the operations are written to the designated registers and/or other memory locations.

In more complex microprocessors, one or more of the four basic stages can be further broken down into smaller stages to simplify each individual stage and even further improve instruction completion speed.

Generally, instructions are read out of memory in a sequential address order. However, instruction branches, in which the retrieval of instructions from sequential address spaces is disrupted, are common.

The hardware in an instruction prefetch stage typically comprises a prefetch buffer or prefetch queue which can temporarily hold instructions. Each cycle, the decode stage can take in the bytes of an instruction held in the prefetch stage for decoding during that decode cycle.

The hardware in a decode stage typically comprises at least a program counter and hardware for converting instructions into control lines for controlling the hardware in the execution stage. Alternately, the decode stage can include a microcode-ROM for decoding instructions. The incoming instruction defines an entry point (i.e., an address) into the microcode-ROM at which the stored data defines the appropriate conditions for the execute stage control lines.

The control data output from the microcode-ROM is written into stage registers for forwarding to the execute stage on the next cycle transition. The decode stage also includes hardware for extracting the operands, if any, from the instruction and presenting the operands to the appropriate hardware in the execution stage through decode stage registers.

Typically, an integrated circuit chip fabricator performs extensive operational testing of each chip before it is deemed to be acceptable. Chips which fail the operational testing are discarded. Operational testing basically comprises tests which determine if the circuit performs the electrical functions it was designed to perform. In its simplest form, operational testing may comprise placing predetermined signals at the input terminals of the chip and reading the outputs of the chip to determine if they are the expected responses to the selected input signals. However, almost all integrated circuit designers now design chips with additional circuitry which is not solely related to the actual function to be performed by the circuit, but is specifically provided for purposes of operational testing of the chip. Such additional circuitry may include additional external pins for inputting or outputting test data and for placing the chip in one or more test modes and multiplexers for allowing signal paths to be altered such that intermediate signals which would normally be inaccessible can be made accessible at the external pins of the chip. Such testing circuitry may also include test registers for holding test results and which can be accessed through the data bus of the chip in test mode. For example, normally inaccessible internal signal lines can be made accessible by providing additional signal paths coupling the signals to a test register and providing multiplexers and test control logic for activating the additional signal paths and/or deactivating the run mode signal paths in test mode. Commonly, additional pins are provided on the chip for setting operational modes. Such operational modes include normal run mode, and at least one, but commonly more than one, test mode.

For instance, it is well known in the prior art to provide a debug operational mode in which the processor can be run for a specified number of cycles and halted. Then, the contents of test registers and/or the output pins of the chip can be read to determine the condition, at that point in time, of various signals on the chip.

The type of testing usually done after fabrication involves testing the chip for a large number of possible faults. One method of doing this is to run through the processor a stream of consecutive data inputs which is designed to cause the circuit being tested to run through a large number of possible faults. Circuit operation is halted after every set of inputs to read out the contents of test registers and/or accessible circuit output pins and store them in a file. This commonly requires an extremely long test input pattern to cover an acceptable amount of the possible input states of the circuit (and thus, possible faults). In fact, if the circuit includes memory elements, as would a microprocessor, the condition of output signals in the circuit would depend not only on the input signals but also on the previous condition of signals on the chip. Accordingly, the test pattern would be even longer to assure that an acceptable portion of all the possible circuit conditions are tested. The file can then be checked against a template file of correct conditions for the given data stream. If there is any inconsistency between the template file and the file generated by the processor in response to the test stream, it is known that the chip has a fault.

This method of testing is extremely time consuming since the processor must be repeatedly stopped to read out the test registers for every cycle of input data presented to the circuit.

Another testing method involves providing one or more linear feedback shift registers (LFSRs) configured as multiple input shift registers (MISRs) in the testing overhead hardware. An MISR is a shift register in which the output from each bit stage (e.g., each flip-flop) of the register is exclusive ORed with an independent input to the register before being forwarded to the input of the succeeding flip-flop. Further, the output of particular ones of said bit stages are fedback to the first bit stage of the register through a series of cascaded feedback exclusive OR-gates.

A given sequence of successive input signal conditions presented at the independent inputs of an MISR (termed a test sequence) will result in a particular set of data (termed a signature pattern) existing in the MISR when the test sequence is completed. Thus, when a particular test sequence is applied at the circuit inputs, if the circuit has no faults which are tested by the test sequence, then the expected signature pattern will exist in the MISR at the end of the test sequence. Mathematical principles dictate that the possibility that a circuit with a fault (which is tested by the test sequence) will result in the identical signature pattern existing in the MISR if there was no fault (termed aliasing) is extremely low. Particularly, the possibility of aliasing is approximately $2^k$, where k is the number of bits of the MISR.

Accordingly, a test sequence designed to test a desirable portion of the possible circuit faults is input to the circuit. This results in a particular pattern of input signals into the MISR, if no faults tested by the test sequence exist. This, in turn, results in a unique signature pattern existing in the MISR at the completion of he test sequence. On the other hand, if a fault existed, then a different pattern will exist in the MISR and it will be known that the circuit has a fault.

The nature of the fault will not be known without further testing. However, much fault testing is of the go/no-go type, in which the nature of the fault is not important because, if the circuit has a fault, it is simply discarded.

This testing method is desirable because the processor essentially can be run at full speed through the test sequence and then stopped at the end of the pattern and the contents of the MISR read out. However, this method requires significant testing hardware overhead in terms of the MISRs themselves as well as whatever routing circuitry (e.g., multiplexers and additional data paths) are needed to route signals to the independent input terminals of the MISRs.

Many texts are available which discuss testing methods and circuit design to facilitate testing. For a relatively brief but comprehensive overview of testing methodology, *The Electrical Engineering Handbook*, editor-in-chief Dorf, R. C., chapter 79 (1993), is recommended. That text is incorporated herein by reference. Also, Laung-Teng Wang and Edward J. McCluskey, *Feedback Shift Registers For Self-Testing Circuits*, VLSI Systems Design, December 1986, pp. 50–57, has a detailed discussion of the use of different types of LFSRs for circuit testing purposes and also is incorporated herein by reference.

Accordingly, it is an object of the present invention to provide an improved method and apparatus for testing a pipelined microprocessor.

It is a further object of the present invention to provide a method and apparatus for testing various stages of a pipelined microprocessor in which the testing circuitry overhead is low.

It is another object of the present invention to provide a method and apparatus for testing various stages of a pipelined microprocessor in which a failure in the testing circuitry will have minimal impact on normal run mode operation.

It is yet another object of the present invention to provide a method and apparatus for testing various stages of a pipelined processor at normal operating speed.

It is yet a further object of the present invention to provide design debug capability.

SUMMARY OF THE INVENTION

The invention is a method and apparatus having extremely low testing hardware overhead for fault testing a pipelined processor. In a pipelined processor, a large number of internal signals which one may wish to observe for testing purposes are provided to stage registers which exist in the pipeline for advancing data from each stage to the next upon the advancement to the next pipeline cycle. Particularly, virtually all signals which are passed from a first pipeline stage to the next stage, e.g., from the decode stage to the execute stage, are stored in a stage register at the end of the first stage for clocking into the next stage when the present pipeline cycle is completed.

By adding an exclusive OR-gate between each flip-flop of the stage register and a few feedback exclusive-OR gates in the stage register, it can be converted into a multiple input shift register (MISR). The exclusive-OR gates between the bit stages of the registers are switched to disable the shift path in normal run mode so that the independent inputs into the registers (i.e., the parallel inputs into the stage registers for run mode) are coupled to the flip-flop inputs of the register without intervening circuitry which can alter the input values. However, a test mode is provided in which the exclusive OR-gates are enabled, thus converting the stage register into an MISR.

If a known test sequence is run through the normal instruction flow path of the processor, then, if there are no faults (which are tested by the test sequence) in the processor, the data sequence into the MISR will be a particular sequence. In turn, the pattern stored in the MISR at the end of the test sequence will be a known signature pattern. If the processor has a fault (which is tested by the test sequence), then the data sequence into the MISR will not be the signature sequence. Mathematical principles dictate that the possibility that a different data sequence into the MISR will result in the identical signature pattern is extremely low. Thus, the possibility that a circuit with a fault (which is tested by the test sequence) will result in the identical signature pattern existing in the MISR is extremely low. Accordingly, in test mode, a sequence of op-codes can be sequentially run through the processor at normal speed and in normal run fashion and the unique signature pattern will be found in the MISR at the end of the test sequence if the processor had no faults. If the processor has one or more faults, then the pattern stored in the MISR at the end of the test sequence will not be identical to the signature pattern.

The ability to obtain reproducible results, however, is compromised unless it can be guaranteed that the test sequence will result in a known pattern of inputs to the MISR. However, this cannot be assured if instructions are executed which might affect circuit operation in different ways on different passes through the circuitry. In order to prevent the execution of instructions from interfering with the condition of the registered signals, the test sequence is allowed to run through the prefetch and decode stages as in normal run mode, but the execute stage is never allowed to execute an instruction. This is accomplished by suppressing the DECODE STAGE DONE signal when in test mode. Accordingly, signals are never clocked from the decode stage to the execute stage and, thus, the execute stage never executes an instruction.

Since this testing mode can run at normal operating speed, great efforts need not necessarily be taken in order to shorten the length of the test sequence. Accordingly, in a preferred embodiment of the invention, a test sequence is applied from external memory comprising every possible op-code, including invalid/unused op-codes. For instance, if the maximum op-code length is one byte wide, a counter can be used to apply 00hex through FFhex sequentially to the pipeline.

At the end of the test sequence, the contents of the MISR are read out. If the pattern stored in the register is not identical to the signature pattern, the processor has a fault.

In order to provide testability of an even greater number of signals, the inputs to the stage registers can be multiplexed. Accordingly, two or more test modes can be provided. For instance, using a 2:1 multiplexer, two test modes can be provided. In a first test mode, the multiplexers are set to their normal run mode condition for testing the signal lines which are normally provided to the stage registers during run mode. In a second test mode, the multiplexers can be switched to input a different series of signals into the register in order to test that series of signals. Even further test modes can be provided by providing a higher order multiplexer, e.g., 3:1, 4:1, etc.

DETAILED DESCRIPTION OF THE DRAWINGS

This application is being filed on even date with a series of other applications which are cross-referenced and incorporated by reference at the end of this specification. Those other applications can be referred to for a more detailed description of the exemplary microprocessor with respect to which the present invention is described herein. However, it should be understood that the test method and apparatus disclosed herein can be used with respect to any pipelined processor. Further, although the description below relates to a particular embodiment in which the test method and apparatus is applied to a decode stage, the invention has broader application and can be applied generally to any one or more stages of a pipelined processor.

Figure 1A:
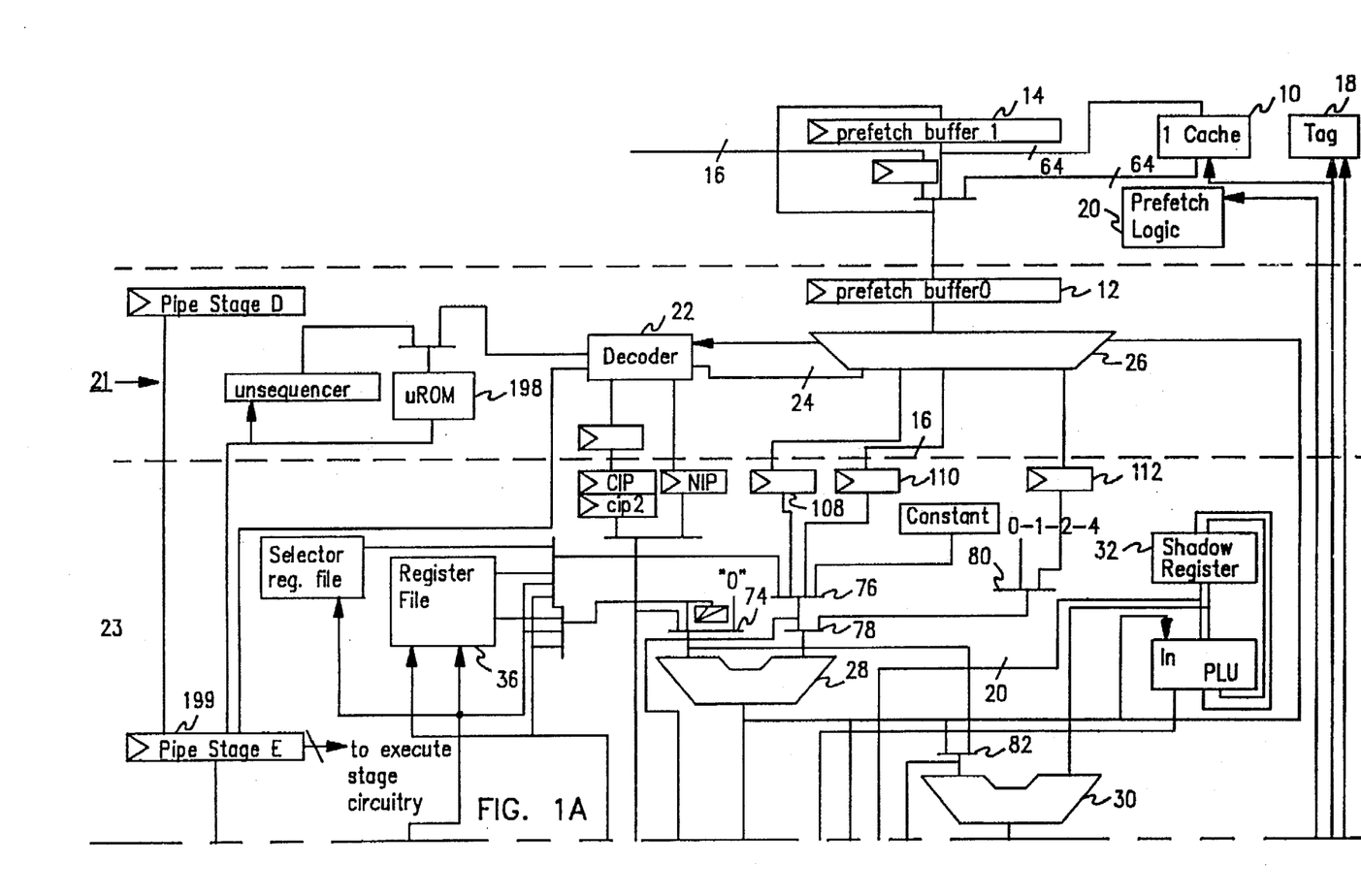
FIGS. 1A and 1B comprise a high level block diagram of an exemplary pipelined microprocessor according to the present invention.
Figure 1B:
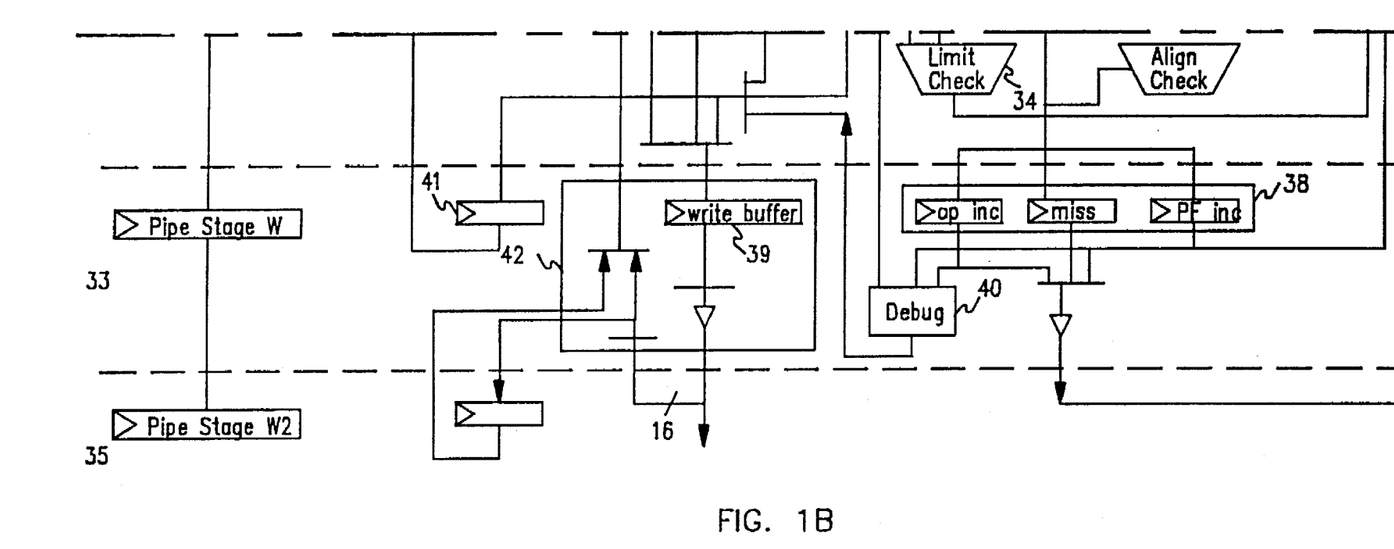

FIGS. 1A and 1B comprise a block diagram generally illustrating the circuitry in the various pipeline stages of an exemplary microprocessor within which the present invention can be embodied. As shown, this particular microprocessor is pipelined into five stages, namely, (1) a prefetch stage, (2) a decode stage, (3) an execute stage, (4) a write-back stage, and (5) a second write-back stage.

As shown, the prefetch stage includes two prefetch buffers 12 and 14. Prefetch buffer 12 is the line buffer from which the decode stage pulls instruction bytes. It is the only data interface between the prefetch and decode stages. The prefetch stage also includes a 1 kilobyte instruction cache 10 and a cache tag memory 18 for storing tag data related to the data in the instruction cache 10. The instruction cache is direct mapped with a line size 8 bytes wide. Both prefetch buffers also are 8 bytes wide, containing byte positions 0 (least significant byte) through byte position 7 (most significant byte). The prefetch stage also includes prefetch logic 20 for performing various functions relating to the control of the loading of the prefetch buffers with instructions.

The decode stage 23 includes a data extraction unit 26 for separating the various portions of an instruction such as prefix bytes, op-code bytes, and constant bytes and forwarding them to the appropriate logic in the decode stage for decoding. The decode stage includes a decoder 22 and a microcode ROM 198 for decoding instructions. The prefix and op-code portions of an instruction are sent to the decoder 22. The decoder 22 decodes prefix bytes and partially decodes the op-code and forwards the decoded data (which basically comprises control lines for the execute stage) to a stage register 199. Decoder 22 also addresses a particular location in microcode ROM 198 responsive to the op-code. Microcode ROM 198 outputs the remaining decoded portion of the op-code to stage register 199.

Data extraction unit 26 also extracts constant data bytes of the incoming instruction, if any, and forwards them directly to appropriate stage registers 108, 110 and/or 112. No additional decoding is necessary for constant data. When the pipeline advance clock is pulsed, all of the decoded instruction, including constant data (which is not actually decoded, but is simply extracted and passed to the execute stage) is output from the stage registers 108, 110, 112 and 199 to the execute stage.

The execute stage fetches operands and executes the instructions. It computes memory addresses for purposes of fetching operands out of memory. The execute stage includes a register file 36 which is used to resolve the source and destination information for all operations in the execute stage. As shown in FIG. 1, the outputs of the decode stage registers 108, 110, 112 and 199 are coupled to various portions of the execute stage circuitry for presenting their contents to the appropriate execute stage circuit for executing the instruction.

Any data which needs to be written back to a memory location is forwarded to the execute stage registers, such as registers 39 and 41 for forwarding to the write-back stage on the next pulse of the pipeline stage advance clock.

The write-back stage includes the bus interface unit 38, debug logic 40 and register write-back logic 42. The register write-back logic 42 returns data to the designated destination address in memory.

A second write-back stage 35 is provided for special cases to allow completion of an independent register operation out of order while a memory write access is still pending.

Since each pipeline stage in a pipelined processor inherently includes one or more stage registers for temporarily holding the output data of each stage until it can be clocked into the next stage, a very small amount of testing circuitry can be added to the circuit design to allow these registers to be converted into linear feedback shift registers (LFSRs), and particularly multiple input shift registers (MISRs). A small amount of additional logic is needed to turn the exclusive OR-gates on or off depending on whether the circuit is in test mode or run mode, respectively. Also needed is a small amount of circuitry for selectively coupling the stage registers to the data bus so data stored in the registers can be read directly out at the end of a test sequence.

Figure 2:
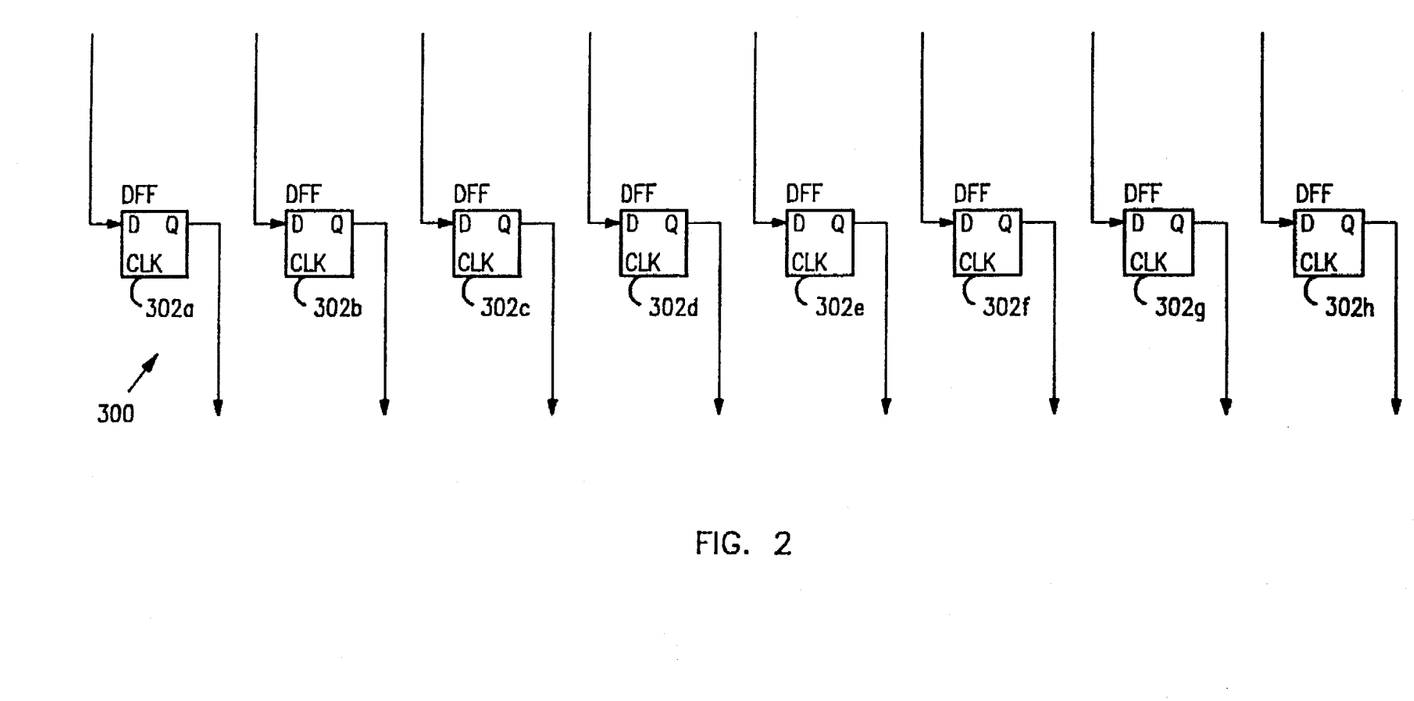
FIG. 2 is a diagram of a stage register.

FIG. 2 illustrates the construction of a typical stage register 300. Basically, it comprises a plurality of D flip-flops 302a–302h, each having its input terminal D coupled to a particular signal line in a first stage, e.g., the decode stage, and an output terminal Q coupled to a particular destination in the following stage, e.g., the execute stage. The flip-flops are all clocked simultaneously by a cycle advance clock.

As previously noted, an MISR is a shift register in which the output of each flip-flop in the register is exclusive ORed with an independent input before being inputted to the succeeding flip-flop. In addition, a plurality of feedback exclusive OR-gates are included in the feedback path from the output of the last flip-flop to the input of the first flip-flop for exclusive ORing into the feedback loop the output of intermediate flip-flops in the register.

For a series of successive parallel input signal conditions at the independent inputs of an MISR, the data existing in the MISR when the test sequence is completed is known. Thus, if a particular sequence of parallel signals at the independent inputs to the MISR are applied, then a known signature pattern will exist in the MISR at the end of the test sequence. Mathematical principles dictate that if the input pattern differs from the desired test sequence in any way, the pattern stored in the MISR at the end of the sequence is virtually guaranteed to be a different pattern.

Accordingly, applying a known test sequence to the inputs of a circuit, the outputs of which circuit are coupled into the independent inputs of an MISR and then checking the contents of the MISR at the end of the sequence against a signature pattern is an extremely effective way of determining if the circuit is operating properly. If the pattern in the MISR at the end of the test sequence is the desired signature pattern, then no faults were detected in the circuit. Otherwise, if the condition of the MISR at the end of the test sequence is inconsistent with the signature pattern, then a fault was detected.

Figure 3:
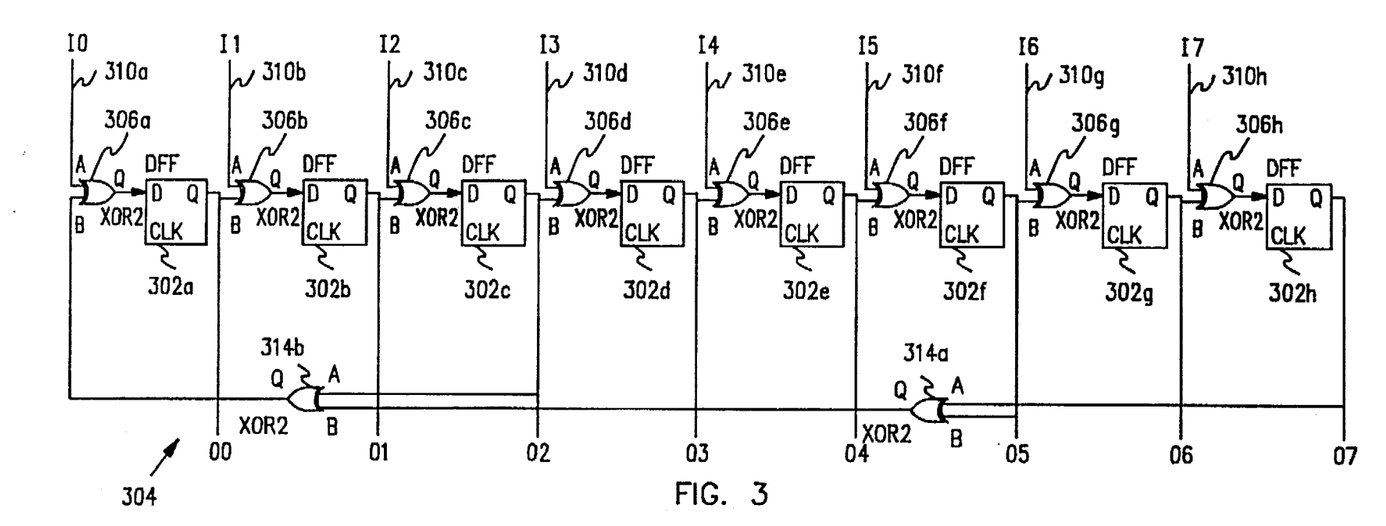
FIG. 3 is a diagram of a multiple input shift register according to the present invention.

Thus, the addition of an exclusive OR-gate between each consecutive flip-flop in the register and a few additional feedback exclusive OR-gates converts the stage register illustrated in FIG. 2 into a multiple input shift register 304 as illustrated in FIG. 3 which can be used for testing. As illustrated, an MISR is a shift register in which an exclusive OR-gate 306a–306h is positioned between each pair of consecutive flip-flops 302a–302h of the register. The output of each flip-flop 302 is coupled to one input, B, of an exclusive OR-gate 306. The output Q of the exclusive OR-gate 306 is coupled to the input terminal of the succeeding flip-flop in the register. The other input, A, of each exclusive OR-gate is coupled to an independent input signal 310a–310h. The output of the last flip-flop in the register is fed back to the input of the first flip-flop. However, in an MISR, one or more feedback exclusive OR-gates 314a, 314b are interposed in the feedback loop from the output of the last flip-flop to the input of the first flip-flop. Particularly, the feedback signal is exclusive ORed with the output of selected intermediate flip-flops. The particular bit position or bit positions which must be exclusive ORed into the feedback loop depends on the width of the MISR. FIG. 3 illustrates an 8 bit MISR. For this particular 8 bit MISR, the output of the third and sixth bit positions are exclusive ORed into the feedback path. It should be noted that, since an MISR essentially defines a circular data path, the path between any two consecutive flip-flops can be configured as the "feedback" path, which includes the additional taps for exclusive ORing the outputs of intermediate flip-flops. It need not necessarily be the path between the output of the last flip-flop and the input of the first flip-flop as shown in FIG. 3. In any event, by applying known mathematical principles, optimal bit positions for the feedback exclusive OR-gates can be determined for any desired length MISR to guarantee minimal aliasing.

In order to allow the stage register to be alternately configurable as (1) a typical parallel register, as shown in FIG. 2, for run mode operation, and (2) an MISR, as shown in FIG. 3, for test mode operation, the exclusive OR-gates 306a–306h should be designed such that, in normal run mode, they allow the signal presented at their independent inputs, A, to pass through without alteration regardless of the condition of the signal at their other inputs, B. In other words, the shift path is disabled. However, in test mode, the gates must be enabled to operate as exclusive OR gates.

Figure 4:
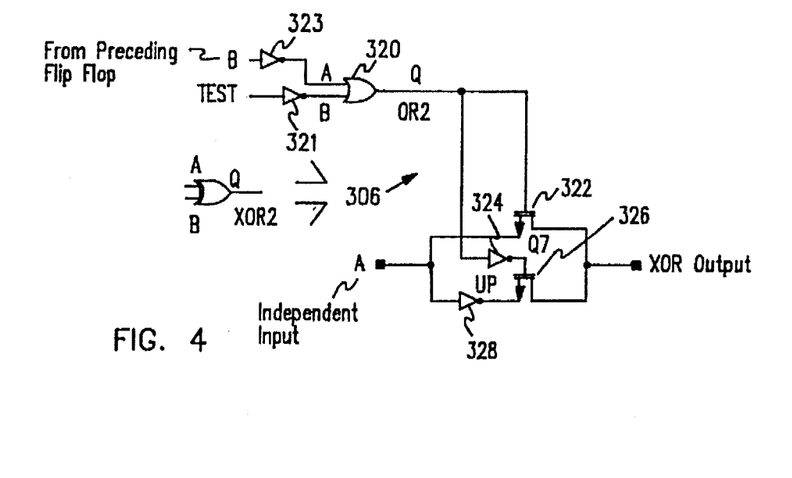
FIG. 4 is a diagram of a modified exclusive-OR gate for use in the multiple input shift register illustrated in FIG. 3 according to the present invention.

FIG. 4 illustrates an exemplary construction for an exclusive OR-gate 306 which can be enabled and disabled by a one bit TEST signal. Typically, integrated circuits, including microprocessors, are designed with external package pins for setting the mode of operation of the circuit. Typically, possible modes include a run mode and at least one test mode. In test mode, the TEST signal would be asserted high. In run mode, it would be an unasserted low.

Referring to FIG. 4, when the microprocessor is not in test mode, the TEST signal is not asserted. The TEST signal is inverted by inverter 321 and input to one of the two inputs of OR-gate 320. Accordingly, when the microprocessor is not in test mode, the output of exclusive OR-gate 320 will always be asserted regardless of the condition of the preceding flip-flop which is input at input terminal B of the exclusive OR gate 306. The output of OR gate 320 is coupled directly to the gate terminal of a first transistor 322 and is coupled through an inverter 324 to the gate terminal of a second transistor 326. Accordingly, when the test signal is not asserted, transistor 322 will be on and transistor 326 will be off. The independent input is coupled directly to the emitter of transistor 322 and is coupled, through an inverter 328, to the emitter of transistor 326. Since, when the TEST signal is not asserted, transistor 322 is on and transistor 326 is off, the output Q of the exclusive OR-gate 306 will be the signal at the independent input A of the exclusive OR-gate 306. Thus, the exclusive OR-gate is disabled and the independent input is passed through it without alteration.

However, when the microprocessor is placed into test mode and the TEST signal is asserted, the output of OR-gate 320 depends on the signal at the B input of exclusive OR-gate 306. As previously noted, the B input to each exclusive OR gate 306 is the output of the previous flip-flop in the shift register. The signal from the previous flip-flop is inverted by inverter 323 before being presented to the input of OR gate 320. Those skilled in the art will recognize from reviewing the circuit shown in FIG. 4 that when the TEST signal is asserted, the circuit operates as a normal exclusive OR-gate.

The feedback exclusive OR gates 314 may be of the same configuration as exclusive OR gates 306. However, they need not be provided with means for disabling them since the disabling of exclusive OR gates 306 will prevent the feedback exclusive OR gates 314 from having any effect on the register.

Thus, adding a few exclusive OR-gates into the pre-existing stage registers, converts them into MISRs which can be used for fault testing. Additional testing circuitry includes a path by which the contents of the MISR can be read out externally of the processor when the test sequence is completed. This might include data paths from the outputs of the MISR to the data bus, some tri-states for allowing output signals of the MISR to affect the data bus only when in test mode, and some control circuitry for locking the bus at the end of the test sequence to allow the MISR contents to be read out without interference from any other data placed on the bus.

In test mode, a predetermined test sequence is run through the processor in the same manner that instructions would normally be run through the processor. For instance, the test sequence can simply be every possible op-code in the instruction set. It may even include invalid op-codes such that the test sequence can be generated by a counter which simply runs from 00Hex to FFhex (assuming that the op-codes are one byte wide). The particular pattern of independent input signals this sequence generates at the independent inputs of the MISR results in a unique set of contents existing in the MISR at the completion of the input test sequence. If a fault existed in the circuitry, then the contents of the MISR will not match the signature pattern and a fault is thus detected.

Figure 5:
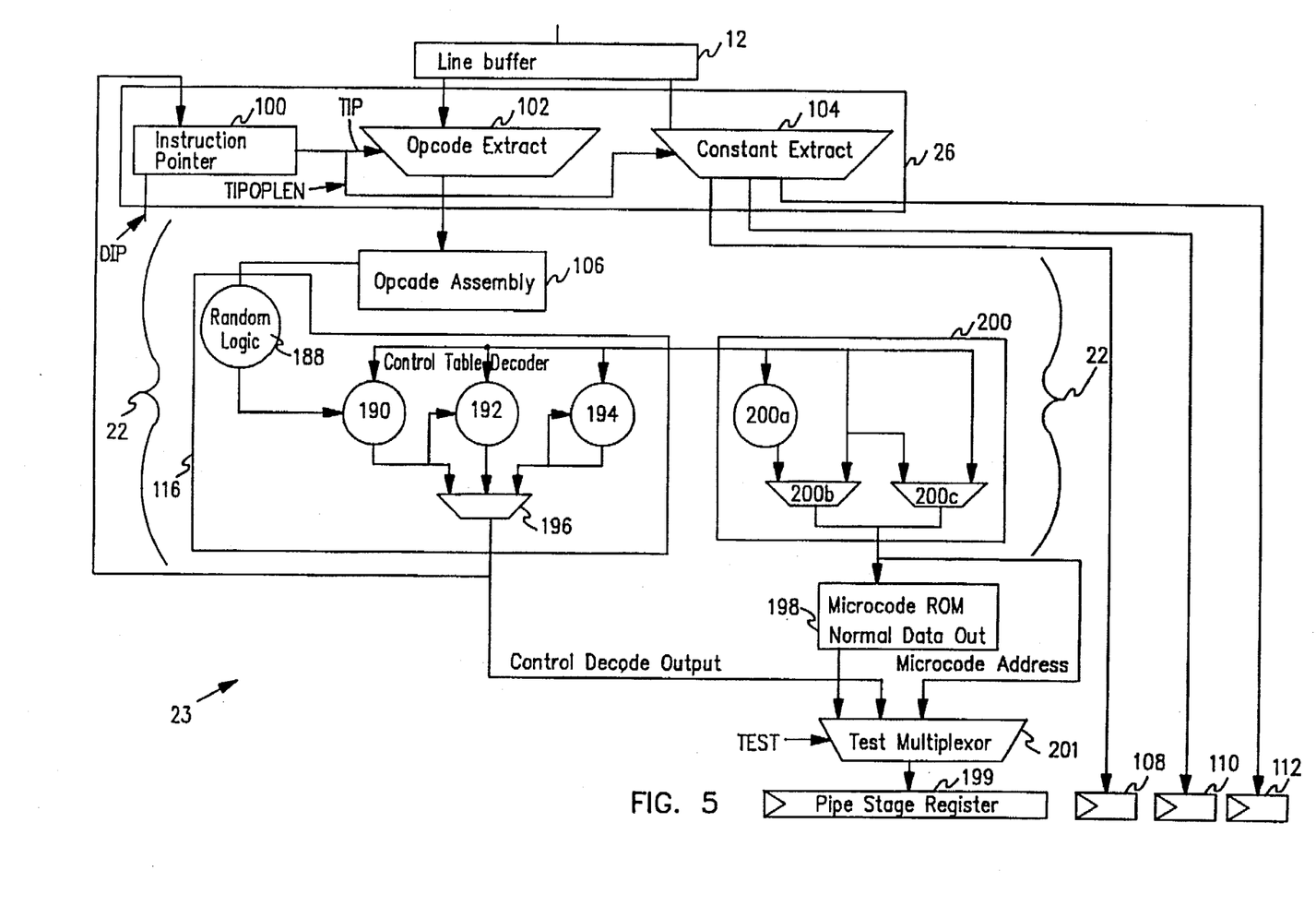
FIG. 5 is a detailed block diagram of the decode stage of a pipelined microprocessor according to the present invention.

The attempted execution by the execute stage of the signals which are output from the decode stage register (i.e., the MISR) responsive to the test sequence should be prevented. Particularly, when chips are tested, the contents of the registers and other memory locations on the chip are typically unknown. The test sequence will likely cause the execute stage to perform register and memory operations, the results of which depend on the contents of the relevant register or memory location. Since the contents of the memory are not controlled, repeatability cannot be assured. This circumstance, of course, would defeat the purpose of this type of testing. Accordingly, the execute stage should be prevented from attempting to execute instructions responsive to the input test sequence. This is accomplished by suppressing the DECODE STAGE DONE signal when the microprocessor is in test mode. The DECODE STAGE DONE signal is a signal in addition to the pipeline cycle clock for enabling the DECODE STAGE registers to forward their data to the execute stage. Particularly, since it may take more than one cycle for an instruction to be decoded, data is not forwarded from the decode stage to the execute stage every time the pipeline cycle clock is asserted. Accordingly, the pipeline cycle clock is validated by the DECODE STAGE DONE signal. The DECODE STAGE DONE signal is asserted at the end of a cycle in which the decode stage has completed decoding of an instruction. The DECODE STAGE DONE signal can be suppressed, for instance, by ANDing it with the inverse of the TEST signal as shown in FIG. 5 and dicussed further below. Accordingly, the normal flow through the pipeline is essentially halted at the beginning of the execute stage.

At the end of the test sequence, the contents of the MISR are read out as previously described. If the pattern read out from the MISR is not identical to the signature pattern, it is known that the processor has a fault. Although the exact nature of the fault is not known, this test method is useful for go/no go testing, in which it is not necessary to know the nature of a fault since the chip will simply be discarded if there is any fault on it.

The invention, however, can be adapted for more specific fault testing or debugging. Particularly, circuitry can be provided to stop the pipeline at intermediate points in the test sequence and have the MISR read out. These intermediate points can be as frequent as once every pipeline cycle. In this manner, the particular instruction during which the fault first appeared can be determined. In fact, if the pipe is stopped every cycle and the data read out from the MISR, not only is the particular instruction which caused the error determined, but the particular signal line in which the error occurred is known. Even further, a test mode can be provided in which the shift path through the register is disabled and the pipe is stopped every cycle to read out the contents of the stage register. This mode would not use the register as an MISR but as a standard parallel register and would be nothing more than a typical debug mode.

The above described method and apparatus allows testing of all of the signal paths into the stage registers. If it is desired to test additional signals, then multiple test modes can be provided by multiplexing plural lines to each input of the MISR. During normal run mode, a first set of inputs to the multiplexer are selected so as to cause the circuit to operate in normal fashion. In a first test mode, the input signals to the MISR can remain exactly the same as in normal test mode so those signal paths can be tested. However, in additional test modes, other inputs to the multiplexers can be selected so that the MISR receives a different set of input signals. Any number of test modes can be provided by increasing the number of selectable inputs to the multiplexer.

Further, the MISRs need not be configured to be of identical length to the individual stage registers. For instance, one stage register can be configured in test mode into two or more MISRs. For instance, a 64 bit wide stage register can be configured into two 32 bit wide MISRs. Particularly, instead of feeding the output of the thirty-second flip-flop through an exclusive OR-gate to the input of the thirty-third flip-flop, it can be fed back to the input of the first flip-flop (through the proper number of intermediate feedback exclusive OR-gates). The thirty-third flip-flop then would simply be coupled to receive the output of the sixty-fourth flip-flop (through the proper number of intermediate feedback exclusive OR-gates).

Alternatively, an MISR can be made longer than any single stage register by simply connecting the output of the last flip-flop of one register to the input of the first flip-flop of another register through an exclusive OR gate. The feedback path also would be made continuous over the plural registers.

A particular embodiment of the invention in which it is incorporated into the microprocessor disclosed in the co-pending patent applications listed at the end of this specification will now be described for exemplary purposes.

FIG. 5 is a more detailed block diagram of the decode stage 23 of the pipelined microprocessor shown in FIG. 1. It is particularly adapted for the instruction set of the x86 family of processors developed by Intel Corporation of Santa Clara, Calif. A familiarity with the x86 architecture instruction set is assumed herein. The line buffer 12 is shown at the top of the diagram. The decode stage pulls instruction bytes out of byte positions in the line buffer 12 as dictated by a series of instruction pointers generated by instruction pointer generating circuit 100. The instruction pointers include a demand instruction point (DIP), a temporary instruction pointer (TIP), and an op-code length pointer (TIPOPLEN). The DIP is generated each cycle to point to the linear address of the first byte of the instruction currently being operated on by the decode stage. The TIP is generated each cycle to point to the first byte of the instruction which has not yet been consumed by the decode stage 23. The TIP will be the same as the DIP at the beginning of the decoding of an instruction. The TIPOPLEN pointer is set to the sum of the TIP pointer and the op-code length so that it points to the first byte of constant data in the instruction, if any. The prefetch stage 21 loads the line buffer 12 and the decode stage 23 consumes bytes from the line buffer 12 in a circular queue fashion. In other words, the pointers are updated in a consecutive fashion from byte 0 through byte 7, and when byte 7 is consumed, the pointers wrap around back to byte 0. In the terminology of this specification, bytes are "consumed" by the decode stage when they are passed through the data extraction circuits 102 and 104 to the op-code assembly circuit 106 and/or constant data ports 108, 110 and 112 where they are either passed on for decoding or stored in shadow registers, as described more fully below.

If an instruction has any prefix bytes, they are consumed one per cycle. All op-code bytes as well as all bytes of the first operand, if any, are consumed simultaneously in one cycle following the decoding of the last prefix byte. If the instruction has a second operand, all of its bytes are consumed simultaneously in a further subsequent cycle.

The op-code data extraction circuit 102 is an 8 byte to 3 byte extraction circuit. It takes in all 8 bytes from the line buffer 12 and selects the 3 bytes following the TIP pointer, i.e. it selects the byte position in the line buffer pointed to by the TIP pointer and the two following bytes (in a circular queue fashion). The op-code extraction circuit 102 includes circuitry for quickly determining if the byte pointed to by the TIP pointer is a valid op-code byte or a valid prefix byte.

If it is a valid prefix byte, it is forwarded to op-code assembly circuit 106, where it is directed into prefix decoding logic in control decode logic circuit 116. Control decode logic 116 sets a flag in a prefix flag register corresponding to the information conveyed by the prefix byte.

After the prefix byte is consumed, the TIP is incremented by one. This process is followed for each prefix byte until the first byte in the op-code data extraction circuit 102 is an op-code byte, rather than a prefix byte.

When the first byte in the op-code extraction circuit 102 (i.e., the byte position pointed to by the TIP) is a valid op-code byte, the bytes are processed differently. In particular, the op-code extraction unit 102 includes logic for very quickly pre-decoding the op-code to determine whether the instruction includes constant data, whether the constant data comprises one or two operands, and the width of the operand or operands. The op-code width is added to the TIP pointer to generate the TIPOPLEN pointer, which is used to load the constant data extraction unit 104 with the four bytes of data following the last byte of the op-code. Unless the op-code data extraction unit determines that it has received valid bytes for the entire op-code and the first operand, if any, it does not update the TIP.

If the instruction includes constant data, then constant data extraction unit 104 becomes relevant. Constant data extraction unit 104 is an 8 byte to 4 byte extractor which extracts the byte in the byte position in the line buffer pointed to by the TIPOPLEN pointer and the three consecutive following bytes (in modulo 8 arithmetic). The constant data extraction unit 104 checks the first operand bytes for validity. When all the bytes of the op-code and all bytes of the first operand are valid, the op-code extraction unit 102 consumes the op-code bytes by forwarding them to an op-code assembly circuit 106. Simultaneously, the constant data extraction circuit 104 consumes the first operand bytes, if any, by forwarding them to data port 108, if it is immediate data, or data port 112, if it is displacement data.

The TIP is now increment by the number of bytes consumed. If the instruction was one having no constant data or only one operand (so that the instruction has now been completely consumed), the DIP is loaded with the TIP value so that DIP and TIP both now point to the beginning of the next instruction and the DECODE STAGE DONE signal 107 is asserted. If, however, the instruction is one which includes a second operand, only the TIP is updated and the TIPOPLEN pointer is set equal to the TIP pointer. The constant data extraction circuit 104 now takes in the next four bytes.

When all of the bytes of the second operand are available, those bytes are consumed by the decode stage, i.e., forwarded to the immediate two data port 110. The TIP is then incremented to the first byte of the next instruction and the DIP pointer is loaded with the new TIP pointer value and the DECODE STAGE DONE signal 107 is asserted.

Control decode circuit 116 decodes dynamic control information of the instruction, while the fixed functional instruction information is decoded by a microcode ROM 198. The dynamic control information includes the prefix parameters, such as op-code shift length, constant shift length, base and index pointers, and register sources and destinations. Random logic circuit 188 in control decode circuit 116 receives the three bytes output by the op-code assembly circuit 106. When the first byte is a valid prefix byte, the random logic updates a prefix register, as previously described. When the incoming bytes comprise an op-code, operation differs. Random logic 188 includes a small combinational logic section which determines certain dynamic parameters of the instruction. First, random logic 188 determines if the instruction has a MODR/M byte and/or an SIB byte and generates three one bit signals, NOMODHIT, MODHIT, and SIBHIT. The op-code bytes are simultaneously decoded in three tables, 190, 192 and 194 corresponding, respectively, to how the op-code byte(s) should be decoded if (1) there is no MODR/M byte, (2) there is a MODR/M byte, but no SIB byte, and (3) there is a MODR/M byte and a SIB byte. The dynamic data output from the tables 190, 192, 194 includes the width of the op-code and constant data of the instruction, the identity of the registers containing the base and index pointers to be used for addressing during that instruction, and the source and destination registers for data needed for or generated by that instruction. It also includes information as to when the decoding of the instruction is complete. The outputs of the three tables are forwarded to a 3:1 multiplexer 196, which is controlled by the three aforementioned HIT signals generated by random logic 188 to select the output signals from the appropriate one of the three tables 190, 192, and 194. Alternately, tri-states having outputs coupled to a common bus can be used instead of the multiplexer 196.

Address generation circuit 200 includes a small combinational logic cell 200a and some multiplexers 200b and 200c for generating an entry address into a microcode ROM 198 for the particular instruction, as a function of certain MODR/M bits received from the op-code assembly circuit 106 as well as certain dynamic control information received from the tables in the control decode logic 116 through multiplexer 196. Responsive to an address output from address generator 200, microcode ROM 198 outputs control lines for operating the execute stage as needed to perform the particular instruction.

In run mode, the dynamic control information output by multiplexer 196 and the data output lines of microcode ROM 198 must be latched into decode stage register 199 for forwarding into the execute stage on the next pipeline cycle. However, in accordance with the present invention, those signals are first provided to a test multiplexer 201. In normal run mode, test multiplexer 201 is controlled to select the control decode circuit outputs and the microcode ROM outputs for forwarding to the buffer register 199. In addition, two test modes are provided. The DECODE STAGE DONE signal tells the execute stage that the decode stage has completed decoding an instruction and that it may now pull the decoded instruction out of the decode stage registers, including register 199, at the next pulse of the pipeline cycle clock signal.

In both test modes, the DECODE STAGE DONE signal 107 is suppressed. As previously noted, the DECODE STAGE DONE signal 107 can be suppressed, for instance, by ANDing it with the inverse of the test signal. In particular, the DECODE STAGE DONE signal is a first input to AND-gate 109. The second input to AND-gate 109 is the test signal inverted by inverter 111. Accordingly, the execute stage never affects the decode stage. Further, in both test modes, the exclusive OR-gates which turn the register 199 into a MISR are enabled. In the first test mode, however, multiplexer 201 is controlled to continue to select the same inputs that it does in normal run mode. Accordingly, in this first test mode, an input test sequence is used to check the normal decode outputs from control decode logic 116 and microcode ROM 198. In the second test mode, multiplexer 201 is set to select the outputs from the microcode address generation circuit 200 so that the address generation into microcode ROM 198 can be more directly tested.

The signature pattern at the end of the test sequence will depend, not only on the inputs to the register during the test sequence, but also on the contents of the register at the beginning of the test sequence. Accordingly, the register 199 must be initialized to a known pattern at the beginning of the test sequence to assure proper testing. This can be accomplished by providing the capability to reset the bytes in the register 199. However, more preferably, the beginning of the test sequence can comprise one or more initialization input patterns which will assure that the register 199 is in a specified condition at the end of the initialization pattern(s). The latter method requires no added testing circuitry.

In addition, a means must be provided for ending the data sequence. This can be accomplished by providing a counter for pulsing the register 199 in test mode. However, this counter would need to be extremely large since the test sequence is likely to be very long. A more preferable method is to utilize an unused op-code in the instruction set in conjunction with the test mode line being asserted to shut off the register 199 and cause it to hold the current pattern in the register. This op-code would be included as the last op-code in the test sequence.

In a preferred embodiment (not shown) some or all of the instruction pointers from instruction pointer circuit 100 are also provided to multiplexer 201 for forwarding into register 199 in the second test mode.

The longer the MISR, the lower the chance of aliasing since the likelihood of aliasing is inversely proportionally to the square of the width of the register. Accordingly, in the preferred embodiment, a 32 byte MISR width is selected. The decode stage register 199 is 85 bytes wide in a particular preferred embodiment of the invention. Accordingly, it is configured into three 32 bit wide MISRs in test mode. In the last register, the last 15 bytes are not used.

A third test mode is included to provide access to the contents of the register 199 in a non-aliased format for debug activities. Particularly, in this third test mode, the shift path is disabled so the contents of the register 199 can be directly read out onto the data bus.

In the illustrated embodiment of the invention, the constant data ports 108, 110 and 112 are not reconfigured as MISRs for testing. Testing of these ports in this manner is deemed unnecessary because the constant data can be easily observed through normal chip operation.

Although the above example relates to testing of the decode stage, it should be understood, that the present invention can be adapted to test other stages of a pipelined processor also.

The invention embodiments described herein have been implemented in an integrated circuit which includes a number of additional functions and features which are described in the following co-pending, commonly assigned patent applications, the disclosure of each of which is incorporated herein by reference: U.S. patent application Ser. No. 08/451,319, entitled "DISPLAY CONTROLLER CAPABLE OF ACCESSING AN EXTERNAL MEMORY FOR GRAY SCALE MODULATION DATA" (atty. docket no. NSC1-62700); U.S. patent application Ser. No. 08/451,965, entitled "SERIAL INTERFACE CAPABLE OF OPERATING IN TWO DIFFERENT SERIAL DATA TRANSFER MODES" (atty. docket no. NSC1-62800); U.S. patent application Ser No. 08/453,076, entitled "HIGH PERFORMANCE MULTIFUNCTION DIRECT MEMORY ACCESS (DMA) CONTROLLER" (atty. docket no. NSC1-62900); U.S. patent application Ser. No. 08/452,001, entitled "OPEN DRAIN MULTI-SOURCE CLOCK GENERATOR HAVING MINIMUM PULSE WIDTH" (atty. docket no. NSC1-63000); U.S. patent application Ser. No. 08/451,503, entitled "INTEGRATED CIRCUIT WITH MULTIPLE FUNCTIONS SHARING MULTIPLE INTERNAL SIGNAL BUSES ACCORDING TO DISTRIBUTED BUS ACCESS AND CONTROL ARBITRATION" (atty. docket no. NSC1-63100); U.S. patent application Ser. No. 08/451,924, entitled "EXECUTION UNIT ARCHITECTURE TO SUPPORT x86 INSTRUCTION SET AND x86 SEGMENTED ADDRESSING" (atty. docket no. NSC1-63300); U.S. patent application Ser. No. 08/451,444, entitled "BARREL SHIFTER" (atty. docket no. NSC1-63400); U.S. patent application Ser. No. 08/451,204, entitled "BIT SEARCHING THROUGH 8, 16, OR 32-BIT OPERANDS USING A 32-BIT DATA PATH" (atty. docket no. NSC1-63500); U.S. patent application Ser. No. 08/451,195, entitled "DOUBLE PRECISION (64-BIT) SHIFT OPERATIONS USING A 32-BIT DATA PATH" (atty. docket no. NSC1-63600); U.S. patent application Ser. No. 08/451,571, entitled "METHOD FOR PERFORMING SIGNED DIVISION" (atty. docket no. NSC1-63700); U.S. patent application Ser. No. 08/452,162, entitled "METHOD FOR PERFORMING ROTATE THROUGH CARRY USING A 32-BIT BARREL SHIFTER AND COUNTER" (atty. docket no. NSC1-63800); U.S. patent application Ser. No. 08/451,434, entitled "AREA AND TIME EFFICIENT FIELD EXTRACTION CIRCUIT" (atty. docket no. NSC1-63900); U.S. patent application Ser. No. 08/451,535, entitled "NON-ARITHMETICAL CIRCULAR BUFFER CELL AVAILABILITY STATUS INDICATOR CIRCUIT" (atty. docket no. NSC1-64000); U.S. patent application Ser. No. 08/445,563, entitled "TAGGED PREFETCH AND INSTRUCTION DECODER FOR VARIABLE LENGTH INSTRUCTION SET AND METHOD OF OPERATION" (atty. docket no. NSC1-64100); U.S. patent application Ser. No. 08/450,153, (now U.S. Pat. No. 5,546,353, issued Aug. 13, 1996) entitled "PARTITIONED DECODER CIRCUIT FOR LOW POWER OPERATION" (atty. docket no. NSC1-64200); U.S. patent application Ser. No. 08/451,495, entitled "CIRCUIT FOR DESIGNATING INSTRUCTION POINTERS FOR USE BY A PROCESSOR DECODER" (atty. docket no. NSC1-64300); U.S. patent application Ser. No. 08/451,219, entitled "CIRCUIT FOR GENERATING A DEMAND-BASED GATED CLOCK" (atty. docket no. NSC1-64500); U.S. patent application Ser. No. 08/451,214, entitled "INCREMENTOR/DECREMENTOR" (atty. docket no. NSC1-64700); U.S. patent application Ser. No. 08/451,150, entitled "A PIPELINED MICROPROCESSOR THAT PIPELINES MEMORY REQUESTS TO AN EXTERNAL MEMORY" (atty. docket no. NSC1-64800); U.S. patent application Ser. No. 08/451,198, entitled "CODE BREAKPOINT DECODER" (atty. docket no. NSC1-64900); U.S. patent application Ser. No. 08/445,569, entitled "TWO TIER PREFETCH BUFFER STRUCTURE AND METHOD WITH BYPASS" (atty. docket no. NSC1-65000); U.S. patent application Ser. No. 08/445,564, entitled "INSTRUCTION LIMIT CHECK FOR MICROPROCESSOR" (atty. docket no. NSC1-65100); U.S. patent application Ser. No. 08/452,306, entitled "A PIPELINED MICROPROCESSOR THAT MAKES MEMORY REQUESTS TO A CACHE MEMORY AND AN EXTERNAL MEMORY CONTROLLER DURING THE SAME CLOCK CYCLE" (atty. docket no. NSC1-65200); U.S. patent application Ser. No. 08/452,080, entitled "APPARATUS AND METHOD FOR EFFICIENT COMPUTATION OF A 486™ MICROPROCESSOR COMPATIBLE POP INSTRUCTION" (atty. docket no. NSC1-65700); U.S. patent application Ser. No. 08/450,154, entitled "APPARATUS AND METHOD FOR EFFICIENTLY DETERMINING ADDRESSES FOR MISALIGNED DATA STORED IN MEMORY" (atty. docket no. NSC1-65800); U.S. patent application Ser. No. 08/451,742, entitled "METHOD OF IMPLEMENTING FAST 486™ MICROPROCESSOR COMPATIBLE STRING OPERATION" (atty. docket no. NSC1-65900); U.S. patent application Ser. No. 08/452,659, entitled "A PIPELINED MICROPROCESSOR THAT PREVENTS THE CACHE FROM BEING READ WHEN THE CONTENTS OF THE CACHE ARE INVALID" (atty. docket no. NSC1-66000); U.S. patent application Ser. No. 08/451,507, entitled "DRAM CONTROLLER THAT REDUCES THE TIME REQUIRED TO PROCESS MEMORY REQUESTS" (atty. docket no. NSC1-66300); U.S. patent application Ser. No. 08/451,420, entitled "INTEGRATED PRIMARY BUS AND SECONDARY BUS CONTROLLER WITH REDUCED PIN COUNT" (atty. docket no. NSC1-66400); U.S. patent application Ser. No. 08/452,365, entitled "SUPPLY AND INTERFACE CONFIGURABLE INPUT/OUTPUT BUFFER" (atty. docket no. NSC1-66500); U.S. patent application Ser. No. 08/451,744, entitled "CLOCK GENERATION CIRCUIT FOR A DISPLAY CONTROLLER HAVING A FINE TUNEABLE FRAME RATE" (atty. docket no. NSC1-66600); U.S. patent application Ser. No. 08/451,206, entitled "CONFIGURABLE POWER MANAGEMENT SCHEME" (atty. docket no. NSC1-66700); U.S. patent application Ser. No. 08/452,350, entitled "BIDIRECTIONAL PARALLEL SIGNAL INTERFACE" (atty. docket no. NSC1-67000); U.S. patent application Ser. No. 08/452,094, entitled "LIQUID CRYSTAL DISPLAY (LCD) PROTECTION CIRCUIT" (atty. docket no. NSC1-67100); U.S. patent application Ser. No. 08/450,156, entitled "DISPLAY CONTROLLER CAPABLE OF ACCESSING GRAPHICS DATA FROM A SHARED SYSTEM MEMORY" (atty. docket no. NSC1-67500); U.S. patent application Ser. No. 08/450,726 (now U.S. Pat. No. 5,541,935, issued Jul. 30, 1996) entitled "INTEGRATED CIRCUIT WITH TEST SIGNAL BUSES AND TEST CONTROL CIRCUITS" (atty. docket no. NSC1-67600).

Having thus described a few particular embodiments of the invention, various alterations, modifications and improvements will readily occur to those of skill in the art. Such alternations, modifications and improvements as are made obvious by this disclosure are intended to be part of this description though not expressly stated herein and are intended to be within the spirit and scope of the invention. Accordingly, the foregoing description is by way of example only and not limiting. The invention is limited only as defined in the following claims and equivalents thereto.

We claim:

1. An apparatus for use in fault testing a pipelined processor, said processor comprising at least first and second pipeline stages, said first stage having a parallel stage register for storing instruction data generated in said first stage for transmission from said stage register to said second stage responsive to advancement of a pipeline cycle clock when said processor is operating in a run mode, said apparatus comprising;
   first means for selectively configuring said stage register as a linear feedback shift register,
   second means for selectively disabling data from pipeline stages other than said first stage from affecting said first stage, and
   third means for selectively coupling said stage register so as to be directly accessible external to said processor.

2. An apparatus as set forth in claim 1 wherein said first means selectively configures said stage register as a multiple input shift register.

3. An apparatus as set forth in claim 2 wherein said stage register comprises a plurality of consecutive storage elements, each having an input terminal coupled to a signal line in said first stage and an output terminal and wherein said first means comprises a logic gate corresponding to each storage element of said stage register having an output terminal coupled to the input terminal of the corresponding storage element, a first input terminal coupled to the output of a preceding storage element in a circular fashion add a second input terminal coupled to the signal line of the corresponding storage element.

4. An apparatus as set forth in claim 3 wherein said gate is switchable between a run state in which said gate passes said signal line to said corresponding storage element unaltered such that said stage register operates as a parallel register and a test state in which said gate exclusive ORs its first and second inputs to generate its output.

5. An apparatus as set forth in claim 4 wherein the output of a last one of said storage elements is coupled to the input of a first one of said storage elements through a feedback path comprising at least one feedback exclusive OR gate having a first input terminal coupled to the feedback path, a second input terminal coupled to the output of a one of said storage elements other than said first and last storage elements and an output terminal coupled to said feedback path.

6. An apparatus as set forth in claim 5 wherein said gates are responsive to a test signal for switching between said run state and said test state.

7. An apparatus as set forth in claim 6 wherein said second means comprises means for disabling execution of instructions by said processor.

8. An apparatus as set forth in claim 7 wherein said processor generates a FIRST STAGE DONE signal responsive to said first stage completing a predetermined operation and wherein said second means comprises a suppressing circuit for suppressing said FIRST STAGE DONE signal responsive to said test signal.

9. An apparatus as set forth in claim 8 wherein said suppressing circuit comprises an AND gate having a first input terminal coupled to said FIRST STAGE DONE signal and a second input terminal coupled to said test signal.

10. An apparatus as set forth in claim 6 wherein said gate comprises an OR gate for ORing the signal from the output of said preceding storage element with said test signal and an exclusive OR gate for exclusive ORing an output of said OR gate with said signal line of the corresponding storage element.

11. An apparatus as set forth in claim 1 further comprising switch means for selectively coupling first and second sets of signal lines in said first stage to said stage register.

12. An apparatus as set forth in claim 11 wherein said switch means comprises a multiplexer responsive to a test signal for switching between said first and second sets of signal lines.

13. An apparatus as set forth in claim 12 wherein said first set of signal lines comprises signal lines corresponding to said instruction data in said run mode.

14. An apparatus as set forth in claim 1 wherein said first stage is a decode stage and said second stage is an execute stage.

15. A pipelined processor having first and second operational modes, said first mode adapted for normal run operation and said second mode adapted for fault testing of circuitry in said processor, said processor comprising;

at least first and second pipeline stages, a parallel stage register in said first stage coupled to receive instruction data lines in said first stage for storing said instruction data for subsequent transmission to said second stage responsive to advancement of a pipeline cycle clock when said processor is in said first operational mode, a plurality of switchable logic gates for selectively configuring said stage register as a multiple input shift register responsive to said processor being in said second mode and as a parallel register responsive to said processor is in said first mode, means for disabling execution of instructions by said processor when in said second mode, and a data path coupling said stage register to said data bus, said data path being enabled responsive to said processor being in said first mode.

16. An apparatus as set forth in claim 15 wherein said stage register comprises a plurality of consecutive storage elements and said plurality of switchable logic gates comprises a logic gate corresponding to each storage element of said stage register having an output terminal coupled to the input terminal of the corresponding storage element, a first input terminal coupled to the output of a preceding storage element in a circular fashion and a second input terminal coupled to the signal line input of the corresponding storage element and wherein each said switchable gate passes said signal line input signal to said corresponding storage element unaltered when said processor is in said first mode and said gate exclusive ORs its first and second inputs to generate its output when said processor is in said second mode.

17. An apparatus as set forth in claim 16 wherein said gate comprises an OR gate for ORing the signal from the output of said preceding storage element with said test signal and an exclusive OR gate for exclusive ORing an output of said OR gate with said signal line of the corresponding storage element.

18. An apparatus as set forth in claim 15 wherein said processor generates a FIRST STAGE DONE signal responsive to said first stage completing a predetermined operation and wherein said means for suppressing comprises a suppressing circuit for suppressing said FIRST STAGE DONE signal responsive to said processor being in said second mode.

19. An apparatus as set forth in claim 18 wherein said suppressing circuit comprises an AND gate having a first input terminal coupled to said FIRST STAGE DONE signal and a second input terminal coupled to said test signal.

20. An apparatus as set forth in claim 15 further comprising a switch positioned at the for selectively coupling one of said instruction data lines and a second set of data lines in said first stage to said storage elements of said stage register.

21. An apparatus as set forth in claim 20 wherein said switch means comprises a multiplexer.

22. A method of adapting a pipelined processor for fault testing, said processor including at least first and second pipeline stages, said first stage having a parallel stage register for storing instruction data generated in said first stage for transmission from said stage register to said second stage responsive to advancement of a pipeline cycle clock when said processor is operating in a run mode, said method comprising the steps of;

configuring said stage register as a multiple input shift register, initializing said multiple input shift register, preventing data from pipeline stages other than said first stage from affecting said first stage, inputting a test sequence to said processor, freezing said multiple input shift register at the end of said test sequence, and coupling said stage register so as to be directly accessible external to said processor.

23. A method as set forth in claim 22 wherein said stage register comprises a plurality of consecutive storage elements, each having an input and an output, each input terminal coupled to receive an instruction data line in said first stage, wherein said step of configuring comprises;

exclusive ORing each instruction data line with the output of the preceding storage element before being input to said storage element.

24. A method as set forth in claim 23 wherein said step of configuring further comprises;

exclusive ORing the output of one of said storage elements with the output of at least one other of said storage elements other than the preceding storage element.

25. A method as set forth in claim 24 wherein said method is initiated responsive to said processor being placed in a test mode.

26. A method as set forth in claim 22 wherein said processor generates a FIRST STAGE DONE signal responsive to said first stage completing a predetermined operation and wherein said preventing step comprises suppressing said FIRST STAGE DONE signal.

27. A method as set forth in claim 22 further comprising the step of switching said data input lines into said storage elements.

* * * * *

UNITED STATES PATENT AND TRADEMARK OFFICE
CERTIFICATE OF CORRECTION

PATENT NO. : 5,699,506
DATED : December 16, 1997
INVENTOR(S) : Christopher E. Phillips et al.

It is certified that error appears in the above-identified patent and that said Letters Patent is hereby corrected as shown below:

In Col. 16, line 43, delete "add" and replace with --and--.

Signed and Sealed this

Nineteenth Day of May, 1998

Attest:

BRUCE LEHMAN

Attesting Officer

Commissioner of Patents and Trademarks